United States Patent [19]

Lynk, Jr. et al.

[11] Patent Number: 4,754,450
[45] Date of Patent: Jun. 28, 1988

[54] TDM COMMUNICATION SYSTEM FOR EFFICIENT SPECTRUM UTILIZATION

[75] Inventors: Charles N. Lynk, Jr.; Eric R. Schorman, both of Bedford, Tex.; Donald L. Linder, Palatine, Ill.

[73] Assignee: Motorola, Inc., Schaumburg, Ill.

[21] Appl. No.: 843,882

[22] Filed: Mar. 25, 1986

[51] Int. Cl.$^4$ ............................ H04J 4/00; H04J 3/18
[52] U.S. Cl. ..................................... 370/29; 370/50; 370/97; 370/118
[58] Field of Search ..................... 370/29, 26, 30, 50, 370/75, 95, 97, 109, 118; 381/36; 455/17

[56] References Cited

U.S. PATENT DOCUMENTS

| | | | |
|---|---|---|---|
| 2,531,433 | 11/1950 | Hoffman et al. | 370/29 |
| 2,629,017 | 2/1953 | Dahlbom et al. | |
| 3,471,646 | 10/1969 | Magnuski et al. | 179/15 |
| 3,529,243 | 9/1970 | Reindl. | |
| 3,646,441 | 2/1972 | Magnuski | 325/13 |
| 3,851,104 | 11/1974 | Willard et al. | |
| 4,034,295 | 7/1977 | Kotezawa et al. | 370/29 |
| 4,037,158 | 7/1977 | Eastmond | 325/22 |
| 4,105,973 | 8/1978 | Arnold et al. | |
| 4,107,608 | 8/1978 | Saburi | 325/4 |
| 4,349,918 | 9/1982 | Gordon | 455/20 |
| 4,525,835 | 6/1985 | Vance et al. | 370/29 |
| 4,622,680 | 11/1986 | Zinser | 370/118 |
| 4,625,286 | 11/1986 | Papamichalis et al. | 381/36 |
| 4,630,257 | 12/1986 | White | 370/109 |
| 4,675,863 | 6/1987 | Paneth et al. | 370/50 |

FOREIGN PATENT DOCUMENTS

| | | |
|---|---|---|
| 8400455 | 2/1984 | European Pat. Off. |
| 0115618 | 8/1984 | European Pat. Off. |
| 0145097 | 6/1985 | European Pat. Off. |
| 2538642 | 12/1982 | France. |
| 5952931 | 3/1984 | Japan. |
| 1602839 | 7/1977 | United Kingdom. |

OTHER PUBLICATIONS

Haskew et al, "Results of a Study of the Linear Prediction Vocoder", IEEE Transactions on Communications, vol. COM-21, No. 9, Sep. 1973, pp. 1008-1015.
Kinoshita, et al. "Digital Mobile Radio Telephone System Using TD/FDMA Scheme" 23.4.1-23.4.5-1981 IEEE.

Primary Examiner—Douglas W. Olms
Assistant Examiner—Melvin Marcelo
Attorney, Agent, or Firm—Thomas G. Berry

[57] ABSTRACT

A time division multiplexed (TDM) communication system is disclosed, which apportions radio frequency communication channels into at least two time slots. Voice signals for transmission on this system are analyzed and vo-coded into a digital signal that is transmitted during one or more of the time slots. Received messages are recovered from at least one of these time slots and the voice message synthesized from the vo-coded signal. In this manner multiple voice messages may be transceived in a time division multiplexed manner on a single narrowband communication channel.

27 Claims, 9 Drawing Sheets

TDM COMMUNICATION SYSTEM FOR EFFICIENT SPECTRUM UTILIZATION

BACKGROUND OF THE INVENTION

This invention relates generally to two-way radio communication and more particularly to time division multiplexed digital communication and is more particularly directed to a communication system for the efficient utilization of the frequency spectrum.

Those skilled in the art will appreciate the congested and crowded nature of the available frequency spectrum. The Federal Communication Commission (FCC) have continually sought ways to reallocate the available spectrum or assign previously reserved spectrum to relieve this congestion. This condition is particularly noticeable in metropolitan areas where a large number of radio users are concentrated in a small geographic area. One proposal the FCC is considering is sharing a portion of the UHF television spectrum with the land mobile market (FCC docket 85-172). Another consideration is the reallocation of the land mobile reserve frequencies in the 896–902 MHz region to private land mobile uses (FCC docket 84-1233).

Another alternative for the FCC is to redefine the standard for land mobile communication channels. Currently, the standard for land mobile communication is a channel having a bandwidth of 25 kHz. However, the FCC may redefine this standard to use 12.5 kHz (or possibly 15 kHz) channels. The theory behind this "band-split" is to effectively double the number of channels in any newly allocated frequency spectrum. Potentially, as "older" spectrum is reallocated, all communications equipment will be required to operate in the 12.5 kHz channel bandwidth.

Although facially attractive, a band-split to double the available number of channels is not without cost. Present day communication devices operate with a sufficient frequency guard-band that protects against adjacent-channel interference (given the frequency stability of the transmitters). Of course, the band-split would also reduce the frequency guard-band tending to lead to higher adjacent-channel interference. Even assuming a greater than a two-to-one improvement in transmitter frequency stability, and high selectivity crystal filters for the receivers, adjacent-channel performance may be degraded by a band-split. Thus, there exists substantial technological barriers that must be overcome to provide a radio with comparable performance specifications at a competitive cost in the marketplace. Therefore, a substantial need exists in the market to develop a communication system that will provide an increase in the number of available communication channels that is compatible with present day 25 kHz channel bandwidths.

SUMMARY OF THE INVENTION

Accordingly, it is an object of the present invention to provide a spectrally efficient communication system.

It is a further object of the present invention to provide a communication system readily adaptable to improved coding techniques.

It is a further object of the present invention to provide a communication system that operates in a 25 kHz channel bandwidth that maximizes spectral efficiency.

Accordingly, these and other objects are achieved in the present time division multiplex communication system.

Briefly, according to the invention, a time division multiplexed (TDM) communication system is disclosed, which apportions radio frequency communication channels into at least two time slots. Voice signals for transmission on this system are analyzed and vo-coded into a digital signal that is transmitted during one or more of the time slots. Received messages are recovered from at least one of these time slots and the voice message synthesized from the vo-coded signal. In this manner multiple voice messages may be transceived in a time division multiplexed manner on a single 25 kHz bandwidth channel.

BRIEF DESCRIPTION OF THE DRAWINGS

The features of the present invention which are believed to be novel are set forth with particularity in the appended claims. The invention, together with further objects and advantages thereof, may be understood with reference to the following description, taken in conjunction with the accompanying drawings, and the several figures of which like referenced numerals identify like elements, and in which:

DETAILED DESCRIPTION OF THE PREFERRED EMBODIMENT

Figure 1:
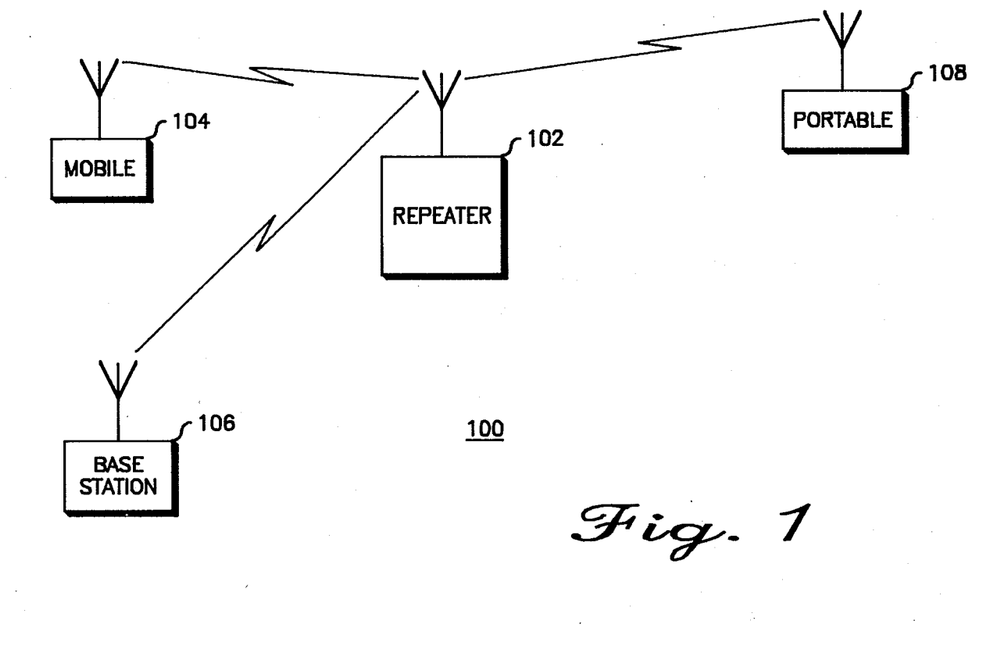
FIG. 1 is a block diagram of a TDM communication system according to the invention.

In FIG. 1 there is shown a block diagram of the time division multiplexed (TDM) system 100 of the present invention. The system is comprised essentially of a repeater 102, a mobile unit 104, a base station 106 and a portable 108. As used herein, a portable unit (108) is defined to be a communication unit typically designed to be carried about the person. A mobile unit (104) is a transceiving unit designed to be carried in vehicles, and a base station (106) is contemplated to be a permanent or semi-permanent installation at a fixed location. The mobile 104, the base station 106 and the portable unit 108 are hereinafter collectively referred to as remote units, and the repeater 102 is hereinafer referred to as the primary station. The remote units communicate via the primary station using radio frequency (RF) channels that are divided into at least two time slots. The RF channels used by the present invention are contemplated to be standard narrowband land mobile channels.

These channels are typically understood to be communication channels having a bandwidth of 25 kHz (for duplex, the channel frequency pairs are spaced 45 MHz apart in the 800 MHz band). Of course, other channel bandwidths and spacings are possible, however, the present invention contemplates the use of standard land mobile channel requirements thereby obviating the need for any new FCC allocations or requirements.

Those skilled in the art can appreciate that human speech contains a large amount of redundant information. To most efficiently utilize the frequency spectrum it is desirable to remove as much of the redundant information as possible prior to transmission The message is then reconstructed at the receiving end from the transmitted essential speech information. Speech production can be modeled as an excitation signal (i.e., air from the lungs) driving a filter (the vocal tract), which possesses a certain resonant structure. The spoken sound changes with time since the filter varies with time. The excitation is noise-like for unvoiced sounds (i.e., consonants) and appears as a periodic excitation for voiced sounds (for example vowels). Therefore, to reduce the amount of bandwidth required to send a voiced signal, the spectral characteristics of the signal must be analyzed and the nature of the excitation signal must be determined.

Prior communication systems have employed speech digitation techniques such as pulse code modulation (PCM) or continuously variable slope delta (CVSD) modulation to attempt to replicate the time wave forms of the speech signals. However, these techniques suffer the detriment of requiring data rates from 12 kbps to 64 kbps. The current state of the art in land mobile communications is a data rate of 12 kbps to 16 kbps on a 25 kHz channel. This allows the transmission of one voice signal using CVSD. Those skilled in the art will appreciate that the combination of more efficient voice coding (for example coding in the range of 2.4 kbps to 9.6 kbps) and more efficient data transmission (18 kbps to 24 kbps on a 25 kHz channel) would allow the transmission of two or more voice signals in 25 kHz of frequency spectrum.

Prior techinques indicate splitting the communication channels into narrow frequency segments, each being the minimum to allow one digitized voice path. These techniques have two distinct disadvantages. First, narrow channels and wide channels do not mix well within a system so that a gradual transition from wider to narrower channels is accompanied by increased co-channel and adjacent channel interference. Secondly, any particular choice of a narrower standard channel bandwidth "freezes" the state of the art. That is, simply redefining and fixing the standard bandwidth for land mobile communications prohibits advantageous exploitation of technological improvements without another reassignment or redefinition of communication standards.

The present invention keeps the current standard for land mobile communication channels while splitting the time among users according to the fraction of the channel bit rate required for on voice signal. This method has the advantages of preserving the present level of interference protection and allowing splitting (in time) as often as needed to take full advantage of advances in the state of the art of coding and data transmission.

The present invention contemplates vo-coding the voice signal to minimize the speech data rate. As used herein, vo-coding means the analysis and synthesis of voice, which either utilizes a vocal track model, or quantizes sub-bands of a speech waveform to remove redundant speech information thereby enabling the transmission of the required voice information in a reduced bandwidth.

A typical example of a vo-coder employing a vocal track model is a linear predictive coder (LPC). An LPC analyzer typically operates on blocks of digitized voice, determining the model parameters that are applicable during a particular block, and transmitting these parameters to a synthesizer at the receiving unit. The synthesizer reconstructs the speech signal by using the parameters received. Since the model parameters vary slowly with time compared to the speech waveform, the redundancy of the speech is removed.

A typical example of a vo-coder employing speech sub-band quantitization is a sub-band coder (SBC). In an SBC analyzer, sub-bands of a speech waveform are quantized and a determination is made concerning the amount of speech energy in each sub-band. Only those sub-bands having an energy content above a predetermined threshold are transmitted thereby enabling transmission in a reduced bandwidth. Accordingly, vo-coding provides a further reduction in the speech data rate by using a coding technique based upon specific speech characteristics, transmitting only the perceptually important information contained in a speech signal. Vo-coding allows a sufficiently low speech coding rate to enable the division of a 25 kHz channel bandwidth, thereby providing a spectrally efficient communication system.

Figure 2:
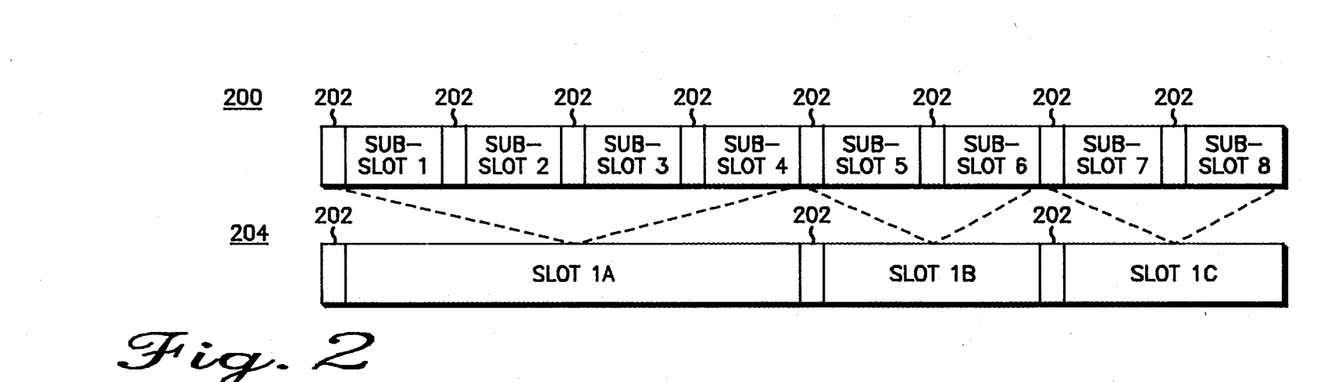
FIG. 2 is an illustration of the preferred organization of a communication channel.

Referring now to FIG. 2, there is shown an RF communication channel 200 subdivided into 8 time sub-slots. Each time sub-slot 1-8 has associated with it an overhead data portion 202 which contains a signalling protocol to be hereinafter defined. Once the RF channel is divided into a predetermined number of time sub-slots (8 in the preferred embodiment) they are grouped into subsets that form communication time slots employed by the actual system users.

Those skilled in the art will appreciate that vo-coding a voice at various coding rates may affect the perceived quality of the received speech. Accordingly, speech vo-coded in a 9.6 kbps sub-band coder may be of higher perceived quality than 2.4 kbps LPC coded speech. Therefore, the present invention contemplated grouping the 8 time sub-slots into subsets as required by the particular vo-coder utilized. An exemplary arrangement of slot assignments is illustrated in FIG. 2 (reference 202). Sub-slots 1-4 have been combined to form slot 1a, which may provide toll quality speech for the users of a system. Slot 1b and slot 1c are formed by combining two sub-slots (5-6 and 7-8 respectively) that may provide speech of a lesser quality that is still acceptable to a particular user. Accordingly, the air-time billing rate may vary depending upon the quality of speech required in a particular user environment. Moreover, as technology improves and the quality of speech for a lower bit rate vo-coder is enhanced, further subdivisions may be readily employed since the system was designed originally to operate with a greater number of time slots (i.e., ultimately the 8 time sub-slots would be communication time slots).

Figure 3A:
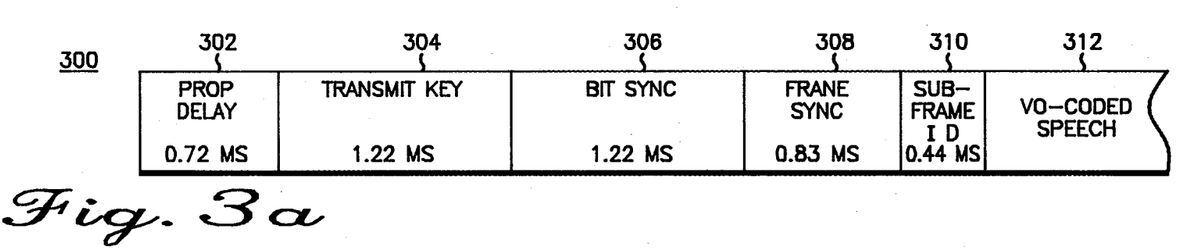
FIG. 3a is an illustration of the preferred organization of the slot overhead for a primary to remote transmission.
Figure 3B:
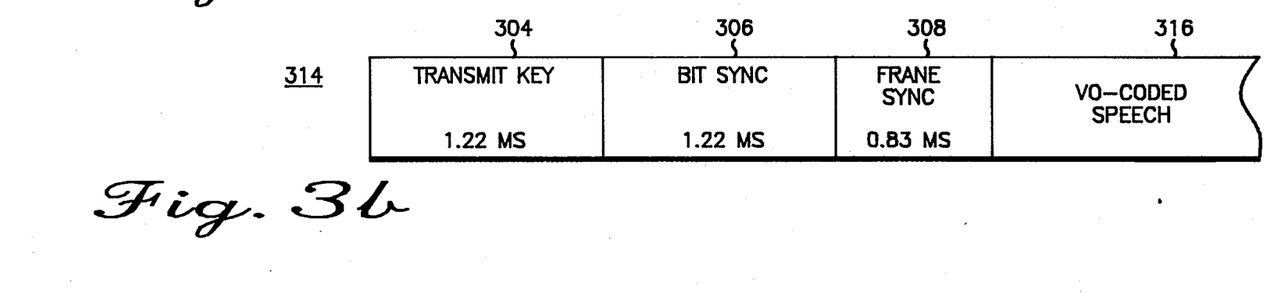
FIG. 3b is an illustration of the preferred organization of the slot overhead for a remote to primary transmission.

Referring now to FIGS. 3a and 3b, there is shown the preferred embodiment of the overhead data information (202 of FIG. 2) for both the primary-to-remote, and remote-to-primary transmissions. FIG. 3a illustrates the primary-to-remote data overhead 300. The data overhead begins with a propagation delay 302. Typically, the maximum propagation time delay will be defined by the particular system coverage designed into a particular implementation. Typically, system range is predominately responsible for determining the propagation delay. For example, the two-way propagation delay for distant remote units (60 miles) may be twelve bits with 18 kbps signalling. If the vo-coded signal received at the primary station (repeater) were simply repeated, the message delay would become a function of the distance of the transmitting remote unit. The receiving remote units would be required to correctly determine where the message information resided within the slot to correctly recover the voice message. Accordingly, the present invention contemplates a system wherein the primary station repeats the information at a fixed point in the slot. All remote units synchronize to the primary station's transmitted signal.

Following the propagation delay 302 is the transmit key time 304. The transmit key time 304 represents the time required to switch a unit between the transmit and receive frequency. This is typically considered to be a hardware limitation, and in the preferred embodiment is 1.22 milli-seconds (ms) in duration. Those skilled in the art will appreciate that the actual number of bits transmitted will depend on the data rate used. Of course, as improved power amplifiers and frequency synthesizers are designed, the transmit key time may decrease to a lesser duration. The bit synchronization pattern 306 follows the transmit key 304. The bit sync portion of the data overhead 300 represents a digital pattern required to obtain bit synchronization between a transmitting unit and a receiving unit. In the preferred embodiment, the bit sync portion 306 consists of 1.22 ms of an alternating logic-one logic-zero pattern. After acquiring bit synchronization, the receiving unit must also have frame synchronization to properly decode one or more time slots. In the preferred embodiment of the present invention the frame synchronization portion 308 consists of a predetermined digital word. The receiving unit must correctly receive the frame sync portion 308 in a majority decision fashion (3 out of 5 in the preferred embodiment) in order to properly acquire frame synchronization. Synchronizing in this manner allows an acceptable system falsing rate utilizing a minimized number of data bits to form the synchronization word. After frame synchronization, the receiving remote unit receives the subframe ID code 310. The subframe ID code contains information which is used by a remote unit to control and direct the receiving circuitry to operate on at least one TDM slot. Of course, as illustrated in FIG. 2, the receiving remote unit may be informed, via the subframe ID 310, that it will group a plurality of time sub-slots into a single user slot. After correctly synchronizing and decoding an assignment to at least one TDM slot, the remote receives the vo-coded speech 312, which follows the data overhead 300.

In FIG. 3b, the data overhead 314 for the remote-to-primary station transmission is illustrated. The data overhead 314 is similar to the data overhead 300 of FIG. 3a except that the propagation delay 302 is not required since the primary station repeats all messages at the same point in the time slot, and the subframe ID 310 is not required since slot assignment is performed by the primary station (repeater). Following the frame synchronization portion 308 (of the remote-to-primary station data overhead 314) the remote unit transmits the vo-coded voice message.

Figure 4:
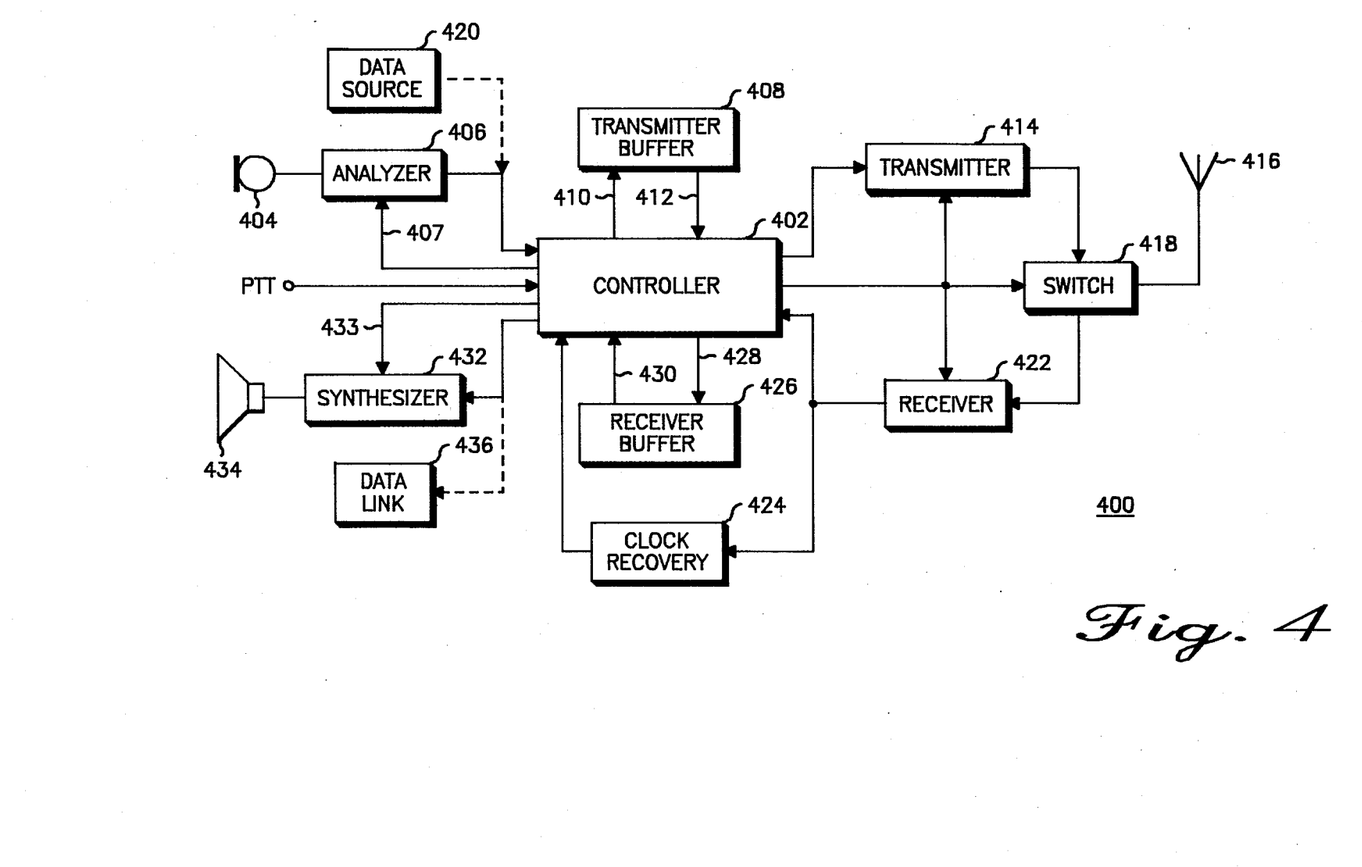
FIG. 4 is a block diagram of a remote unit according to the invention.

In FIG. 4 there is shown a block diagram of a remote unit 400. The heart of the remote unit 400 is the controller 402 (a more detailed illustration and discussion of which follows hereinafter). To transmit, a speech signal is first input via a microphone 404. The speech is analyzed by a vo-coder analyzer 406, which is enabled by the controller 402 via connection 407. The vo-coder analyzer may be any suitable coder and in the preferred embodiment is an LPC or SBC vo-coder. The controller 402 takes the vo-coded information, which is in digital form, and routes it to the transmit buffer 408 via data line 410. The digitized speech information is stored in the transmit buffer 408 at whatever coding rate is selected for the vo-coder analyzer 406. Typical examples of vo-coding data rates include, but are not limited to, 9.6, 4.8, and 2.4 kbps. When the transmit buffer 408 has reached a predetermined capacity limit, the information is extracted by the controller 402 via connection 412 and routed to the transmitter 414. Of course, the controller 402 preambles the speech information by the data overhead portion 202 as illustrated in FIG. 2. The controller 402 couples the transmitter 414 to an antenna 416 via the switch 418. Alternatively, the switch 418 could be replaced with a duplexer (or the like) to continually couple the transmitter and receiver to the antenna. In this manner, the data overhead and speech information are transmitted at a selected transmission data rate, which must be at least twice that of the vo-coding data rate. Alternately, data information (already in digital form) may be transmitted in the same manner via data source 420. Moreover, a combination of vo-coded speech and data may alternatively be sent as determined by a particular user.

To receive information from a time slot, the controller 402 couples the antenna 416 to a receiver 422 via the switch 418. The receiver 422 is coupled both to the controller 402 and a clock recovery means 424, which may be any suitable clock recovery means that will synchronize the controller 402 to the received information using the bit sync or frame sync portions. Once synchronized, the controller 402 takes the received vo-coded speech (or digital data) and routes it to the receive buffer 426 via connection 428. This information is clocked into the receive buffer 426 at a suitable data rate, which typically may be the transmission data rate. The information is extracted from receive buffer 426 via connection 430 and routed through the controller 402 to the vo-coding synthesizer 432. Of course, the information must be extracted at a data rate identical to that which the speech information was vo-coded. The synthesizer 432, enabled by the controller 402 by connection 433, operates on the essential speech components to synthesize the voice signal. This signal is applied to a speaker 434 that allows the message to be received by the operator. If, however, data was transmitted during a TDM slot, the data sink 436, which may be a printer or monitor device, accepts the data and displays it for the operator.

Figure 5:
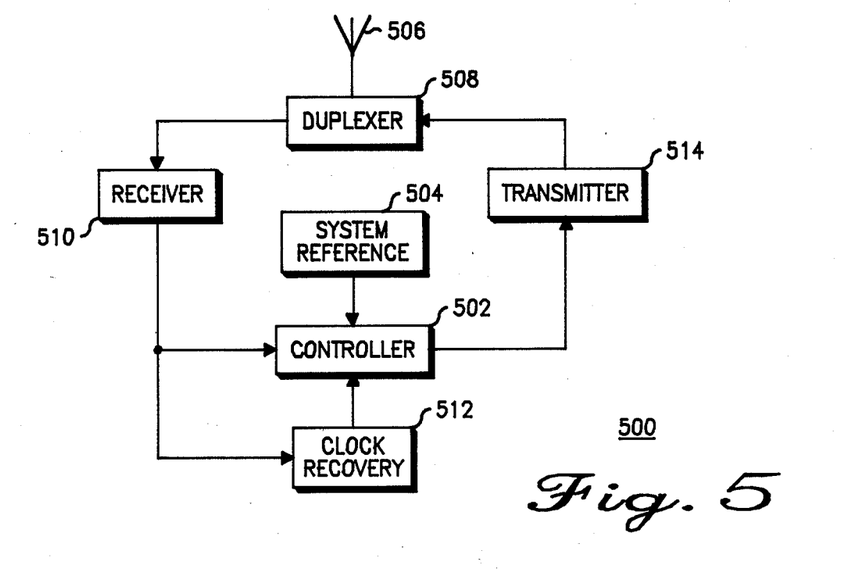
FIG. 5 is a block diagram of a primary unit according to the invention.

Referring now to FIG. 5, there is shown a repeater 500 suitable for use in the TDM communication system of the present invention. The controller 502 controls the operation of the repeater 500. The system reference 504 provides the controller 502 with the clock signal, which is used to determine the transmission data rate. Operationally, a vo-coded signal is received from at least one time slot on a first frequency and travels from the antenna 506 through the duplexer 508 to a receiver 510. The receiver 510 is coupled to a clock recovery device 512 and the controller 502. The controller accepts the received data signal from the receiver 510 at the data rate determined by the clock recovery device 512 and supplies it to the transmitter 514. The transmitter 514 repeats the signal including the overhead 202 in at least one time slot on second frequency (at a transmission data rate determined by the controller 502) through the duplexer 508 to the antenna 506.

Figure 6:
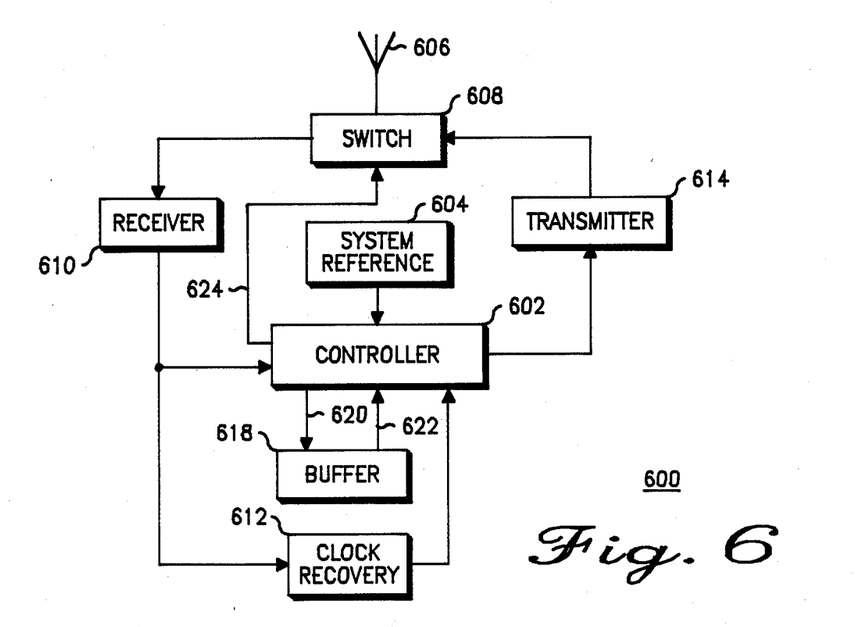
FIG. 6 is a block diagram of a single frequency primary unit according to the invention.

Referring now to FIG. 6, a single frequency repeater (SFR) suitable for use in the TDM system of the present invention is shown. The repeater 600 is controlled by the controller 602, which takes a master clock signal from the system reference 604. A signal is received via antenna 606 and routed via the switch 608 to the receiver 610. The receiver 610 supplies signals to the clock recovery means 612 and the controller 602. The received vo-coded signal is stored in a buffer 618 via connection 620 at the received data rate as determined by the clock recover means 612. The vo-coded message is stored in the buffer 618 until a subsequent time slot, at which time the buffer 618 is emptied by the controller 602 via connection 622 at a predetermined data rate, which is typically the transmission data rate. The controller 602 then routes the buffered signal to the transmitter 614. The transmitter 610 sends the signal to the antenna 606 via the switch 608, which has been coupled to the transmitter via the controller 602 through connection 624. Accordingly, in an SFR, the transmitter 614 and receiver 610 are multiplexed to the antenna 606 a duplexer is not required. Those skilled in the art will appreciate that either the multiple frequency repeater or the single frequency repeater may be used alternately or in combination in any particular TDM system.

Figure 7:
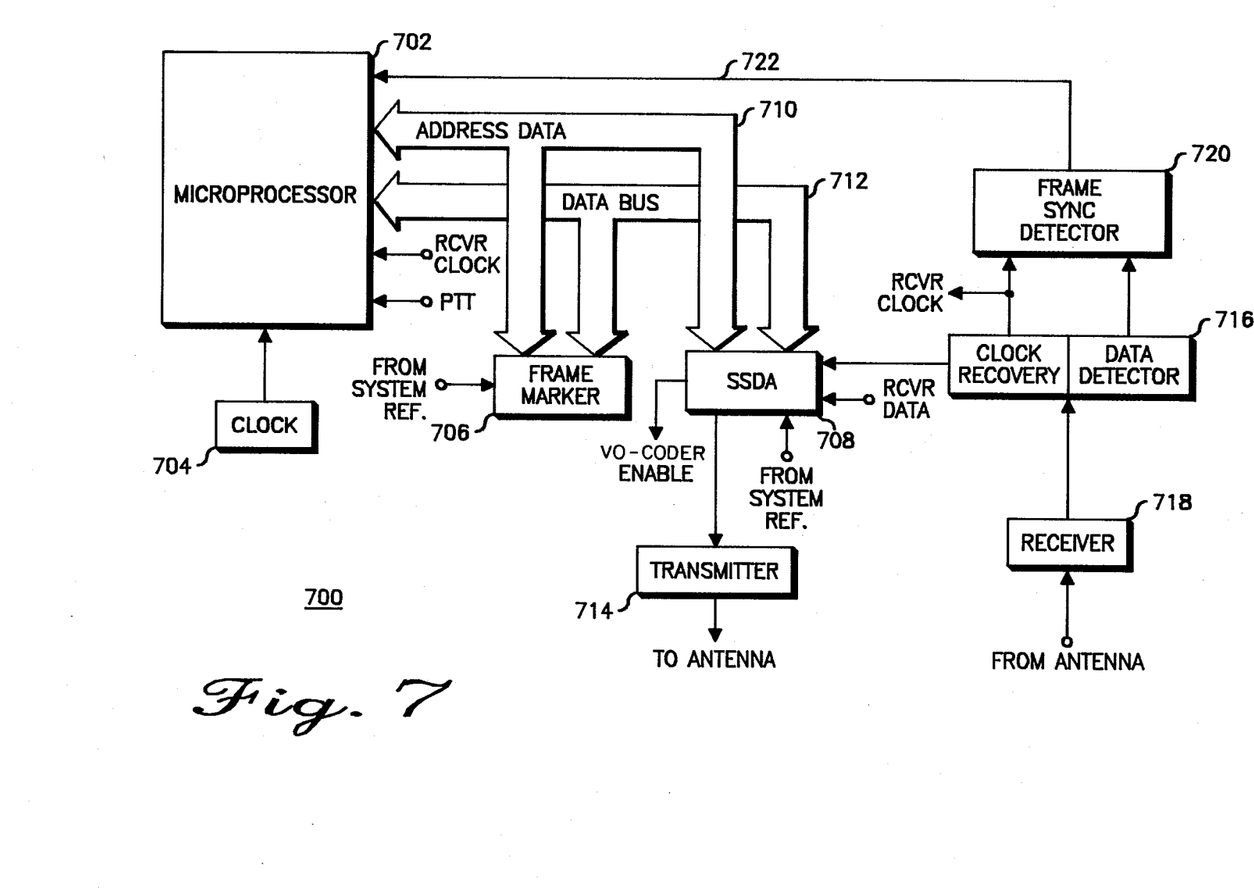
FIG. 7 is a block diagram of the preferred embodiment of the controller of FIGS. 4–6.

Referring now to FIG. 7 there is shown a block diagram of a controller 700 suitable for use in either a primary or remote unit. The controller 700 is comprised of a microprocessor 702, such as an MC6801 manufactured by Motorola, Inc. The microprocessor 702 is supplied a clock signal by clock source 704. The system reference (see FIGS. 5 and 6) is routed to the frame marker 706 and the Synchronous Serial Data Adaptor (SSDA) 708. Microprocessor 702 is coupled to the frame marker 706 and the SSDA 708 via an address bus 710 and a data bus 712. The frame marker 706 is used to generate the frame synchronization information contained in the data overhead as was described in conjunction with FIG. 2. The frame marker 706 can be any convenient device and may be, for example, a programmable timer module (PTM), such as an MC6840 manufactured by Motorola, Inc. The SSDA 708 is used in the controller 700 to accept data from the microprocessor 702 and communicate the data serially to the transmitter 714. In the preferred embodiment, the SSDA is an MC6852 manufactured by Motorola, Inc. The SSDA 708 is also coupled to the clock recovery and data detector 716. The clock recovery data detector 716 is coupled to the receiver 718 and is used to supply the received synchronization information and received vo-coded voice signals to the SSDA 708. Thus, the SSDA is used in both the transmit and receive modes to route data accordingly. The clock recovery and data detector 716 is also coupled to the frame sync detector 720. The frame sync detector 720 receives data from the data detector and clock recovery device 716 and is used to look for the frame sync marker in the received vo-coded signal. When frame synchronization is achieved, the frame sync detector 720 alerts the microprocessor 702 via connection 722. Once the clock recovery device and the frame sync detector have both synchronized, the vo-coded signal can be either repeated (as in the primary stations of FIGS. 5 or 6), or received and routed to the vo-coder synthesizer to recover the voice signal (as in the remote unit of FIG. 4).

Figure 8A:
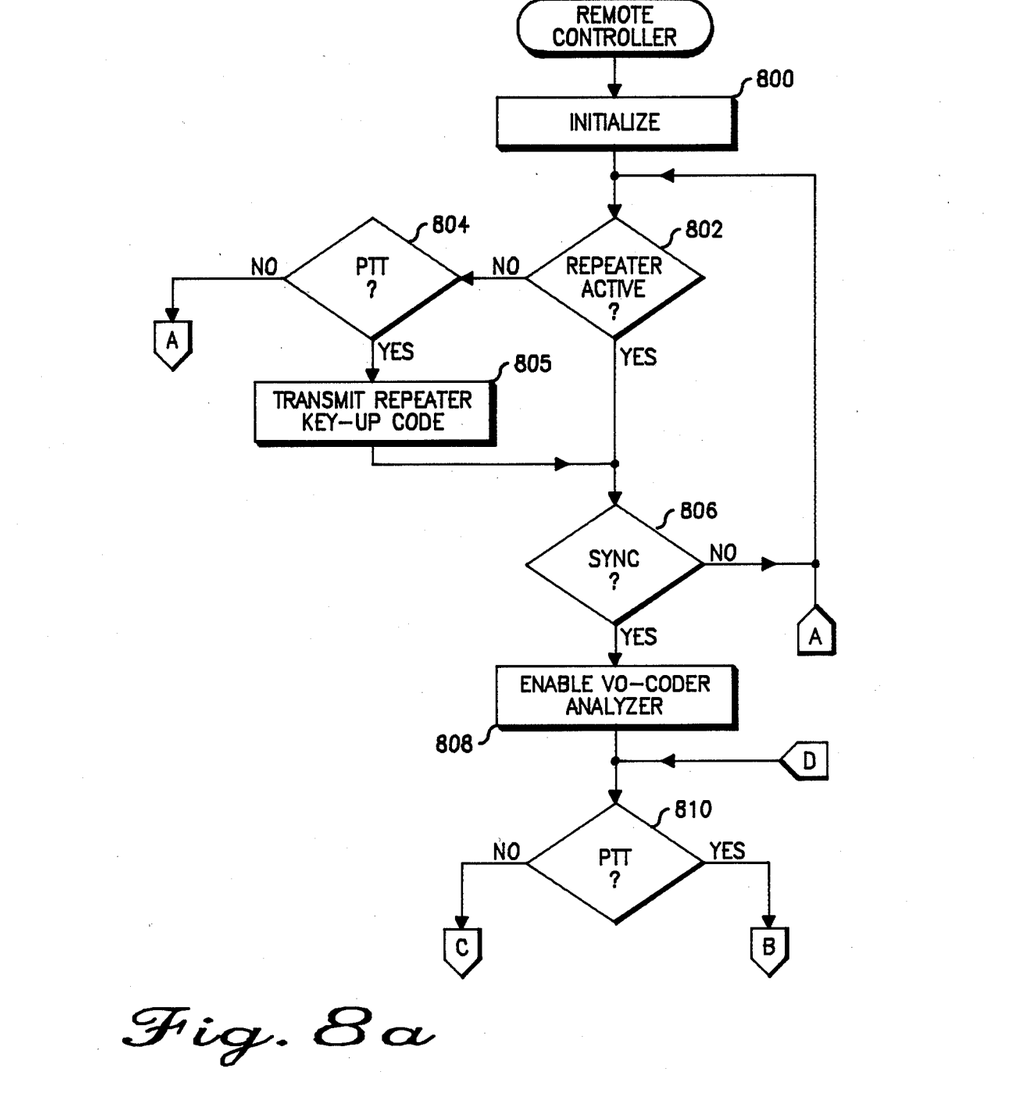
FIGS. 8a–8c are flow diagrams of the steps executed by the controller of FIG. 4.
Figure 8B:
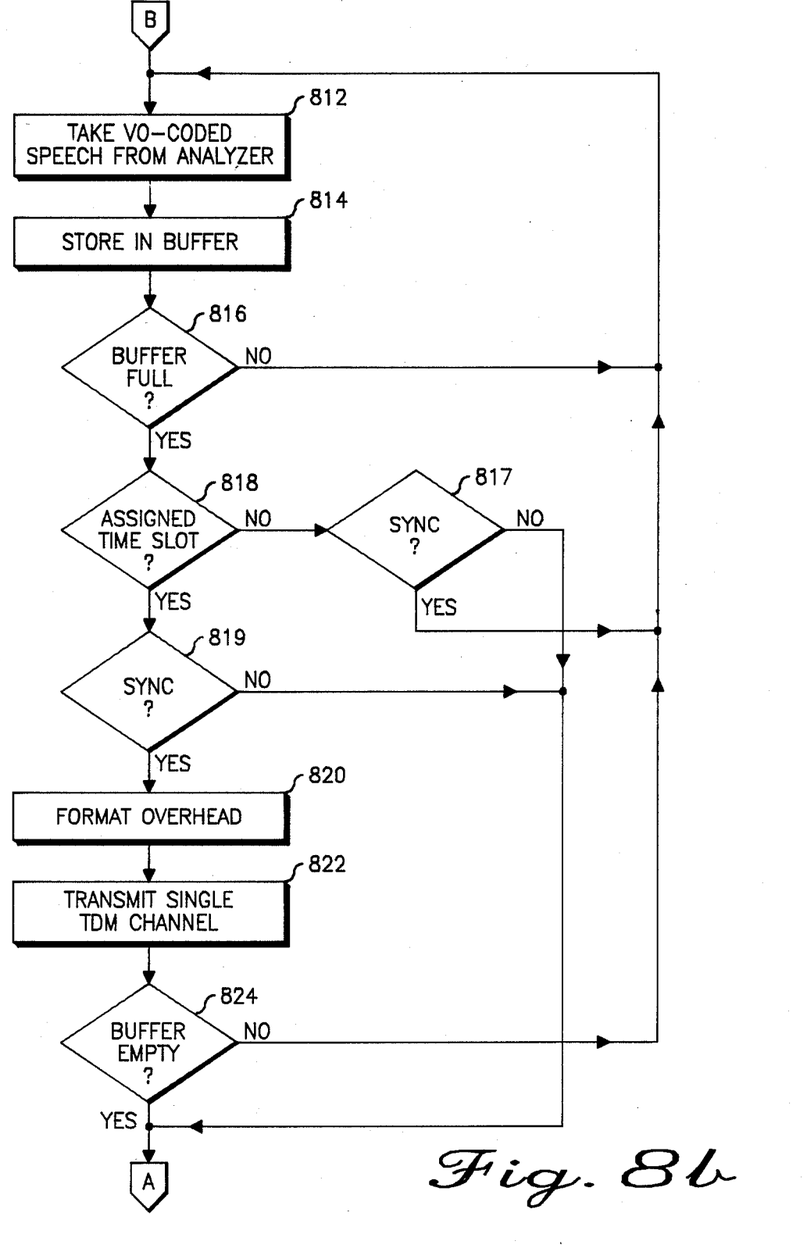
Figure 8C:
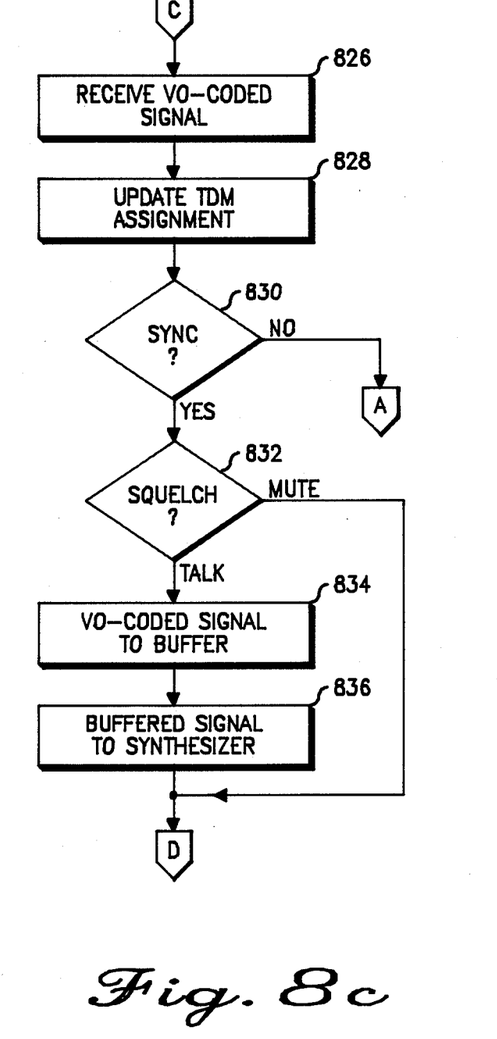

Referring now to FIGS. 8a-8c, there is shown a flow diagram of the steps executed by a controller utilized in a remote unit. In FIG. 8a, the routine begins with the initialization step 800, which is executed during first time operation or after a reset. The initialization step 800 programs any frequency synthesizers and loads various ID codes that may be employed during the operation of the controller. The routine next proceeds to decision 802, which checks to see if the repeater is active. The remote unit determines if the repeater is active via the bit sync circuity that operates on the bit sync portion of the data overhead (see FIG. 3). A positive bit sync indication occurs if the repeater is operating (i.e., transmitting). Of course, if the repeater were inactive, the remote unit would not be able to obtain bit sync.

Referring again to FIG. 8a, if the repeater is not active the routine proceeds to decision 804 to detect whether the push-to-talk (PTT) switch has been actuated to initiate a communication. If the determination of decision 804 is that the PTT switch is not actuated, the routine returns to reference letter A and decision 802. The routine will continue in this loop until the PTT switch is actuated at which time the routine proceeds to step 805. In step 805, the predetermined repeater key-up code is transmitter to activate the repeater. The key-up code may be any suitable code and, of course, if a particular implementation the repeater is always activated, step 805 could be omitted. In the preferred embodiment of the present invention, the repeaters are inactive (i.e., off the air) if no remote unit is transmitting. This conserves energy and increases the mean time between failure (MTBF) of the primary station. Of course, the repeaters could be designed to operate continuously thereby eliminating the need of an activation code. After transmitting the repeater key-up code, the routine proceeds to decision 806. Decision 806 determines whether or not synchronization has been achieved. Both bit synchronization and frame synchronization are required for an affirmative determination in decision 806 (however, bit sync may have already been established in decision 802). Frame sync is determined by a majority determination based on a three-of-five correct receptions of the frame sync word (see FIG. 3). If synchronization is established, the routine proceeds to step 808, which enables the analyzer of the particular vo-coder employed. Following the enabling of the vo-coding analyzer, the routine proceeds to decision 810, which determines whether the PTT switch has been activated. If the switch has been activated, the routine routes to reference letter B of FIG. 8b (to transmit). If the PTT switch is not activated, the routine proceeds to reference letter C of FIG. 8c (to receive).

Referring now to FIG. 8b, the steps involved during the transmit mode of the controller are shown. The routine begins in step 812, which takes the digitized speech information from the vo-coding analyzer. The vo-coded speech is stored in the buffer (408 of FIG. 4) in step 814 at the vo-coding data rate. Decision 816 determines whether the buffer is sufficiently full to begin transmitting. In the preferred embodiment, the buffer is deemed to be full (ready) when at least one-half of one slot of vo-coded data has been buffered. If decision 816 determines that the buffer is not sufficiently full, the routine returns to the reference letter B to receive more vo-coded speech from the analyzer in step 812. If the determination of decision 816 is that the buffer is sufficiently full, the routine proceeds to decision 818 to determine whether the present time slot is the assigned slot of a particular unit. The time slots must be assigned so that the mobile controller knows how many of the sub-slots (1-8) to combine for this particular communication slot. If the present time slot is not the unit's assigned time slot, the routine proceeds to decision 817 to check for sync. If decision 817 determines that sync has been lost, the routine proceeds to reference letter A. Otherwise, the routine proceeds to reference letter B. If decision 818 determines that the present time slot is the unit's assigned time slot, the routine proceeds to step 819 to determine whether the unit is still in frame sync. The unit will have a valid frame sync if it has correctly received five of the past nine frame sync words. If decision 819 determines that the unit has dropped frame sync, control returns to reference letter B. If the unit has held sync, the routine proceeds to step 820, which formats the data overhead preamble as previously described in conjunction with FIG. 3. Following the data overhead formatting of step 820, step 822 transmits a single burst on the TDM channel by transmitting the overhead and vo-coded speech taken from the buffer at the transmission data rate. After this single slot is burst on to the TDM channel, decision 824 determines whether the buffer is empty. If the buffer is not empty, the routine returns to reference letter B which takes more speech and continues to transmit. If the buffer is empty, the routine returns to reference letter A of FIG. 8a which determines whether the repeater is active.

In FIG. 8c, the steps executed by the mobile controller for the receive operation are shown. Routine begins in step 826 which receives the vo-coded signal from one or more time slots in the TDM channel. Step 828 updates the slot assignments for the device employing the controller. In the preferred embodiment, this represents updating a memory location which contains the number of sub-slots (1-8) that may be combined in various arrangements to form communication slots for the TDM device. The routine next proceeds to decision 830 to determine whether or not synchronization has been maintained. An affrrmative determination results if the unit has correctly received five of the past nine frame sync words. If there is synchronization, the routine proceeds to decision 832 to determine whether the communication device is muted or whether the squelch is open to allow reception of the message. Those skilled in the art will appreciate various methods of squelch are known. One technique would consist of detecting whether the received signal is valid data or noise. An alternative would be to use a form of continuous squelch, commonly referred to as "digital private line" (DPL). Another alternative would be to employ begin-of-message (BOM) and end-of-message (EOM) data words pre-ambled and post-ambled to the message, respectively. Basically, any suitable squelch system is acceptable to the present invention to operate as decision 832. If the squelch is muted, the routine returns to reference letter D of FIG. 8a. However, if the squelch is unmuted the routine proceeds to set 834 where the vo-coded signal is placed in the buffer (426 of FIG. 4) at the received data rate. Step 836 removes the buffered signal from the buffer at the vo-coding data rate and presents it to the vo-coding synthesizer (432 in FIG. 4). The vo-coding synthesizer reconstructs the original voice message and presents it to the operator either via a speaker of other means. Following the completion of the synthesized message, the routine returns to reference letter D of FIG. 8a.

Figure 9:
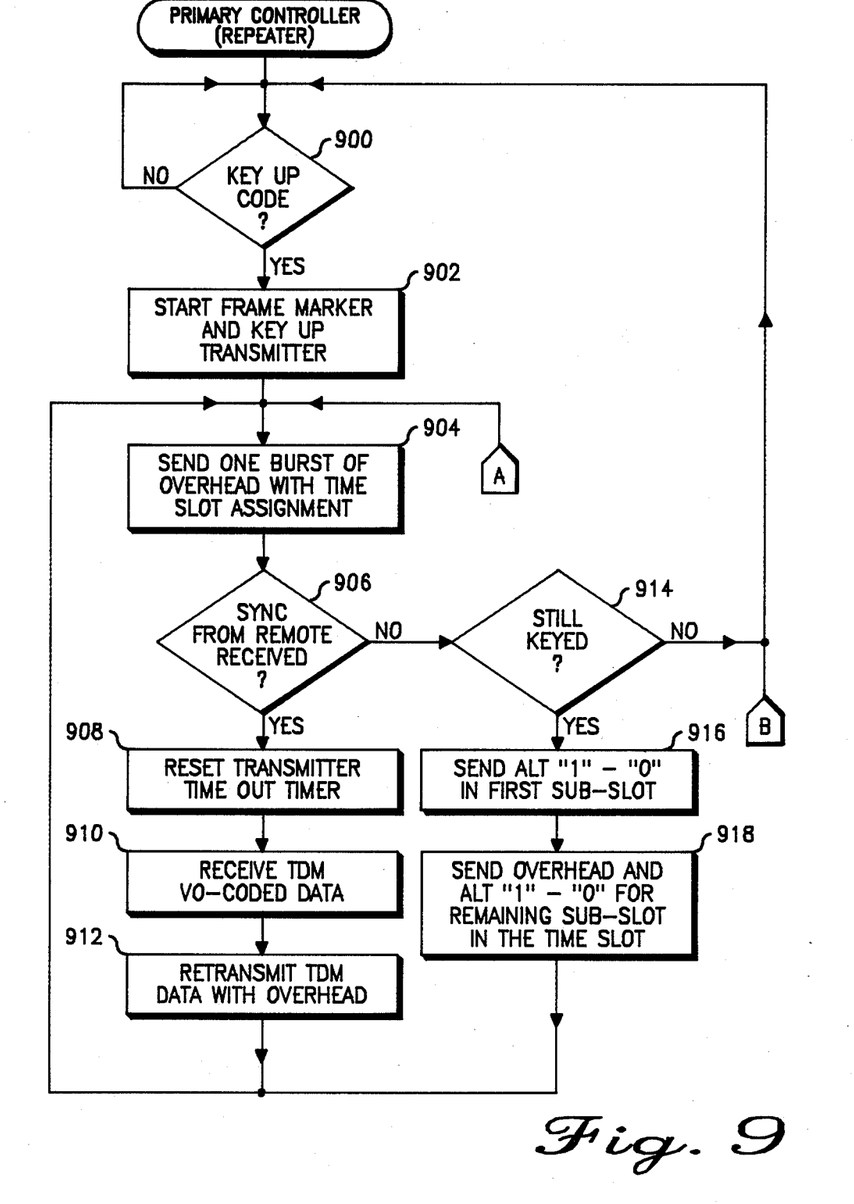
FIG. 9 is a flow diagram of the steps executed by the controller of FIG. 6 or 7.

Referring now to FIG. 9, the steps executed by the primary controller (repeater) are illustrated. The routine begins in decision 900, which determines whether the key up code has been received from a particular remote unit. If the key up code is not received, the repeater waits (i.e., off the air) until a key up code is received. Assuming, however, that the key up code was received, the routine proceeds to step 902, which starts the frame marker and keys up the transmitter. Step 904 transmits one burst of the data overhead defined in FIG. 3 containing the TDM slot assignment for the remote unit. After the remote unit receives sync and a slot assignment, the remote unit transmits the data overhead and TDM vo-coded data message to the repeater. Accordingly, decision 906 determines whether the synchronization (both bit and frame) from the mobile has been received in the present time slot. If sync has been received, the routine proceeds to step 908, which resets a transmitter time-out-timer, which may be present to prevent the transmitter from transmitting either permanently or for prolonged periods. The routine then proceeds to step 910, which receives the TDM vo-coded data from the particular slot (or group of slots) assigned by the repeater. Step 912 retransmits or repeats the TDM data in another time slot on either the same frequency or in the same or different time slot on a second frequency depending upon which type of repeater is employed. Following the retransmission of step 912, the routine returns to reference letter A, which again sends one burst of data overhead with the time slot assignment and continues in this loop until there is no more vo-coded data to transmit.

Referring again to decision 906, if the decision of step 906 is that the synchronization was not received in the present time slot, the routine proceeds to decision 914, which determines whether or not the repeater transmitter is still keyed. The repeater transmitter may not be keyed if the time-out-timer has expired or a dekey code has been received (if any such code is employed). If the determination of decision 914 is that the repeater is still keyed, an alternating logical one and logical zero pattern are transmitted in the first sub-slot in step 916. Following step 916 the data over-head and slot assignment are transmitted in each of the sub-slots that form the particular time slot used. Since the data over-head will not fill a sub-slot, an alternating logical one and logical zero pattern is used to fill each sub-slot. Following step 918 the routine returns to reference letter A, which will again send one burst of data overhead with the time slot assignment to the mobile unit, and then to decision 906 to recheck if the repeater has properly received synchronization from the remote unit. If the determination of decision 914 is that the repeater is no longer keyed, the routine returns to reference letter B, which again will await the key up code before the repeater is operational again.

While a particular embodiment of the invention has been described and shown, it should be understood that the invention is not limited thereto since many modifications may be made. It is therefore contemplated to cover by the present application any and all such modifications that may fall within the true spirit and scope of the basic underlying principles disclosed and claimed herein.

What is claimed is:

1. In a time division multiplex communication system which apportions radio frequency communications channels into at least two time slots for communicating voice signals vo-coded at a predetermined rate, V, a transceiving device comprising:

means for providing a clock signal having a frequency at least twice that of the vo-coding rate;

means for receiving a vo-coded signal from a communication channel having a predetermined maximum data rate, C, during at least one time slot in accordance with a time division multiplex protocol defining N time slots, where N is a positive integer less than or equal to C/V, at a rate approximately equal to said clock signal to provide a received signal, said receiving means including means for synchronizing the device to said received signal;

means for buffering said received signal to provide a buffered signal;

means for transmitting said buffered signal onto said communication channel during at least one of said N time slots at a rate approximately equal to said clock signal, said transmitting means including means for generating and preambling a data signal which includes at least a synchronization signal to said buffered signal;

means for controlling the device whereby the device operates as a single frequency repeater.

2. In a time division multiplex communication system which apportions radio frequency communication channels into at least two time slots for communicating voice signals vo-coded at a predetermined rate, V, a transceiving device comprising:

means for providing a clock signal having a frequency at least twice that of the vo-coding rate;

means for receiving a vo-coded signal from a first communication channel having a predetermined maximum data rate, C, during at least one time slot in accordance with a time division multiplex protocol defining N time slots, where N is a positive integer less than or equal to C/V, at a rate approximately equal to said clock signal to provide a received signal, said receiving means including means for synchronizing the device to said received signal;

means for transmitting said received signal onto a second communication channel also having said predetermined maximum data rate, C, during at least one time slot in accordane with said time division multiplexed protocol defining said N time slots, at a rate approximately equal to said clock signal, said trasmitting means including means for generating and preambling a data signal which includes at least a synchronization signal to said received signal;

means for controlling the device whereby the device operates as a time division multiplex repeater.

3. In a time division multiplex communication system which apportions radio frequency communication channels into at least two time slots for communicating voice signals, an improved transceiving device comprising:

means for receiving a vo-coded signal from a communication channel having predetermined maximum data rate, C, during at least one time slot in accordance with a time division multiplex protocol defining N time slots, where N is a positive integer less than or equal to C/V, where V comprises a selected coding rate, at a rate approximately equal to twice said selected coding rate to provide a received signal, said receiving means including means for synchronizing the device to said received signal;

means for analyzing a voice signal at said selected coding rate to provide a vo-coded signal;

means for generating and preambling a data signal which includes at least a synchronization signal to said vo-coded signal;

first and second buffering means for buffering respectively said recevied signal at approximately twice said selected coding rate, and said vo-coded signal at said selected coding rate;

means for transmitting said buffered vo-coded signal onto said communication channel during at least one of said N time slots at a rate approximately equal to twice said selected coding rate;

means for synthesizing a recovered voice signal from said buffered received signal at a rate approximately equal to said selected coding rate; and means for controlling the time division multiplex transceiving device, whereby the device operates in a first mode to repeat said vo-coded signal received during said first time slot during said second time slot, and operates in a second mode to simulate full duplex operation on a single communication channel.

4. In a time division multiplex communication system which apportions radio frequency communication channels into at least two time slots for communicating voice signals, a transceiving device comprising:

means for transmitting a vo-coded signal onto a communication channel having a predetermined maximum data rate, C, in accordance with a time division multiplex protocol defining N time slots where N is a positive integer less than or equal to C/V, where V comprises a selected coding rate, said vo-coded signal being temporarily buffered at a first rate and transmitted at a rate exceeding 2 V during at least one of said N time slots, said transmitting means including means for analyzing a voice signal at said selected coding rate, V, to provide said vo-coded signal, and means for generating and preambling a data signal, which includes at least a synchronization signal to said vo-coded signal;

means for receiving and buffering a vo-coded signal from the communication channel in accordance with said time division multiplex protocol during at least one of said N time slots to provide a received signal, said receiving means including means for synchronizing to at least a portion of said synchronization signal, and means for processing said received signal at said selected coding rate, V, to synthesize a recovered voice signal from said received signal; and means for intercoupling and controlling said transmitting means and said receiving means such that the device operates to repeat said received signal received in at least one of said N time slots during at least one other time slot thereby providing a single frequency repeater.

5. The device of claim 4, wherein the frequency of said selected coding rate comprises 4.8 kHz.

6. The device of claim 4, wherein the frequency of said selected coding rate comprises 2.4 kHz.

7. The device of claim 4, wherein said analyzing means comprises an LPC analyzer.

8. The device of claim 4, wherein said analyzing means comprises a SBC analyzer.

9. The device of claim 4, wherein said processing means comprises an LPC synthesizer.

10. The device of claim 4, wherein said processing means comprises a SBC synthesizer.

11. The device of claim 4, wherein said transmitting and receiving means are constructed and arranged to operate on a communication channel having a 25 kHz bandwidth.

12. In a time division multiplex communication system which apportions radio frequency communication channels into at least two times slots for communicating voice signals, a transceiving device comprising:

means for transmitting a vo-coded signal onto a communication channel having a predetermined maximum data rate, C, in accordance with a time division multiplex protocol defining N time slots where N is a positive integer less than or equal to C/V, where V comprises a selected coding rate, said vo-coded signal being temporarily buffered at a first rate and transmitted at a rate exceeding 2 V during at least one of said N time slots, said transmitting means including means for analyzing a voice signal at said selected coding rate, V, to provide said vo-coded signal, and means for genrating said preambling a data signal, which includes at least a synchronization signal to said vo-coded signal;

means for receiving and buffering a vo-coded signal from the communication channel in accordance with said time division multiplex protocol during at least one of said N time slots to provide a received signal, said receiving means including means for synchronizing to at least a portion of said synchronization signal, and means for processing said received signal at said selected coding rate, V, to synthesize a recoverd voice signal from said received signal; and means for duplexing said transmitting means and said receiving means such that the device operates to repeat said received signal received from at least one of said N time slots on a first frequency in at least one of said N time slots on a second frequency.

13. The device of claim 12, wherein the frequency of said selected coding rate comprises 4.8 kHz.

14. The device of claim 12, wherein the frequency of said selected coding rate comprises 2.4 KHz.

15. The device of claim 12, wherein said analyzing means comprises an LPC analyzer.

16. The device of claim 12, wherein said analyzing means comprises an SBC analyzer.

17. The device of claim 12, wherein said processing means comprises an LPC synthesizer.

18. The device of claim 12, wherein said processing means comprises an SBC synthesizer.

19. The device of claim 12, wherein said transmitting and said receiving means are constructed and arranged to operate on a communication channel having a 25 kHz bandwidth.

20. In a time division multiplex communication system which apportions radio frequency communication channels into at least two time slots for communicating voice signals, a transceiving device comprising:

means for transmitting a vo-coded signal onto a communication channel having a predetermined maximum data rate, C, in accordance with a time division multiplex protocol defining N time slots where N is a positive integer less than or equal to C/V, where V comprises a selected coding rate, said vo-coded signal being temporarily buffered at a first rate and transmitted at a rate exceeding 2 V during at least one of said N time slots, said transmitting means including means for analyzing a voice signal at said selected coding rate, V, to provide said vo-coded signal, and means for generating and preambling a data signal, whih includes at least a synchronization signal to said vo-coded signal;

means for receiving and buffering a vo-coded signal from the communication channel in accordance with said time division multiplex protocol during at least one of said N time slots to provide a received signal, said receiving means including means for synchronizing to at least a portion of said synchronization signal, and means for processing said received signal at said selected coding rate, V, to synthesize a recovered voice signal from said received signal; and means for controlling and selectively intercoupling said transmitting means and said receiving means, such that the device operates in a first mode to repeat said received signal received in at least one of said N time slots during at least one other time slot, and operates in a second mode to simulate full duplex communication on a single channel.

21. The device of claim 20, wherein the frequency of said selected coding rate comprises 4.8 kHz.

22. The device of claim 20, wherein the frequency of said selected coding rate comprises 2.4 kHz.

23. The device of claim 20, wherein said analyzing means comprises an LPC analyzer.

24. The device of claim 20, wherein said analyzing means comprises an SBC analyzer.

25. The device of claim 20, wherein said processing means comprises an LPC synthesizer.

26. The device of claim 20, wherein said processing means comprises an SBC synthesizer.

27. The device of claim 20, wherein said transmitting and said receiving means are constructed and arranged to operate on a communication channel having a 25 kHz bandwidth.

* * * * *

UNITED STATES PATENT AND TRADEMARK OFFICE
CERTIFICATE OF CORRECTION

PATENT NO. : 4,754,450

DATED : June 28, 1988

INVENTOR(S) : Charles N. Lynk, Jr., et al.

It is certified that error appears in the above-identified patent and that said Letters Patent is hereby corrected as shown below:

Column 13, line 29, "genrating" should read -- generating --.

line 30, "said preambling" should read -- and preambling --.

Column 14, line 23, "whih" should read -- which --.

Signed and Sealed this

Third Day of January, 1989

*Attest:*

DONALD J. QUIGG

*Attesting Officer*      *Commissioner of Patents and Trademarks*